United States Patent
Steciak, Jr.

(10) Patent No.: US 10,478,992 B2
(45) Date of Patent: Nov. 19, 2019

(54) SELF-POWERED TIMBER SLASHER

(71) Applicant: Spruce Creek Mechanical L.L.C., Dolgeville, NY (US)

(72) Inventor: John Steciak, Jr., Dolgeville, NY (US)

(73) Assignee: Spruce Creek Mechanical L.L.C., Dolgeville, NY (US)

( * ) Notice: Subject to any disclaimer, the term of this patent is extended or adjusted under 35 U.S.C. 154(b) by 63 days.

(21) Appl. No.: 16/120,047

(22) Filed: Aug. 31, 2018

(65) Prior Publication Data

US 2019/0009424 A1 Jan. 10, 2019

Related U.S. Application Data

(63) Continuation-in-part of application No. 15/679,491, filed on Aug. 17, 2017, now Pat. No. 10,065,337.

(60) Provisional application No. 62/529,576, filed on Jul. 7, 2017.

(51) Int. Cl.
*B27B 5/10* (2006.01)
*B27B 1/00* (2006.01)

(52) U.S. Cl.
CPC ............... *B27B 5/10* (2013.01); *B27B 1/002* (2013.01)

(58) Field of Classification Search
CPC .. B27B 1/00; B27B 1/002; B27B 5/10; B27B 5/12; B27B 5/14
See application file for complete search history.

(56) References Cited

U.S. PATENT DOCUMENTS

| | | | | |
|---|---|---|---|---|
| 4,164,965 A * | 8/1979 | Bodart | ...................... | B27L 7/00 |
| | | | | 144/195.1 |
| 4,228,708 A * | 10/1980 | Martin | ...................... | B27B 7/02 |
| | | | | 144/376 |
| 4,259,886 A * | 4/1981 | Seid | ........................ | B23D 45/10 |
| | | | | 144/242.1 |
| 4,273,171 A * | 6/1981 | Spaulding, Sr. | .......... | B27L 7/00 |
| | | | | 144/195.1 |
| 4,331,052 A * | 5/1982 | Neff | .......................... | B27B 5/18 |
| | | | | 414/754 |
| 4,441,535 A * | 4/1984 | Flinn | .......................... | B27B 5/10 |
| | | | | 144/193.1 |
| 4,478,263 A * | 10/1984 | Johnston | ................... | B27L 7/00 |
| | | | | 144/195.1 |
| 4,531,440 A * | 7/1985 | Lucky | ...................... | B27B 5/10 |
| | | | | 83/471.2 |
| 4,579,025 A * | 4/1986 | Fasolak | ................ | B23D 45/124 |
| | | | | 82/101 |

(Continued)

*Primary Examiner* — Andrea L Wellington
*Assistant Examiner* — Richard D Crossby, Jr.

(57) ABSTRACT

Disclosed is a self-powered timber slasher. The self-powered timber slasher includes a self-propelled carrier and a powered circular saw mounted on a first end of the self-propelled carrier, wherein the powered circular saw is configured to cut timber. Further, a hydraulic motor coupled to the powered circular saw impart a rotational motion to the powered circular saw based on a flow of the hydraulic fluid that is stored with a hydraulic tank as the hydraulic motor is in fluid connection with the hydraulic tank. Yet further, the self-powered timber slasher a wireless controller electrically coupled to the powered circular saw. The wireless controller is configured to control operation of the powered circular saw based on a command received over a wireless communication channel.

13 Claims, 9 Drawing Sheets

(56) References Cited

U.S. PATENT DOCUMENTS

| | | | | |
|---|---|---|---|---|
| 4,766,790 | A * | 8/1988 | Harris | B23D 53/08 83/56 |
| 4,844,114 | A * | 7/1989 | Moberg | B26D 7/26 137/115.21 |
| RE33,233 | E * | 6/1990 | Freeman | B27L 7/00 144/195.1 |
| 4,930,386 | A * | 6/1990 | Laskowski | B23D 53/04 414/546 |
| 4,938,263 | A * | 7/1990 | Wrightman | B23D 45/024 144/198.1 |
| 5,282,501 | A * | 2/1994 | Miller, III | B27B 31/08 144/193.1 |
| 5,588,474 | A * | 12/1996 | Egging | A01G 23/067 144/24.12 |
| 5,680,888 | A * | 10/1997 | St-Pierre | B23D 59/006 144/133.1 |
| 5,784,941 | A * | 7/1998 | Sanborn | B27B 17/005 83/471.2 |
| 6,014,996 | A * | 1/2000 | Egging | A01G 23/067 123/352 |
| 6,230,770 | B1 * | 5/2001 | Spaargaren | A01G 23/067 144/24.12 |
| 6,269,719 | B1 * | 8/2001 | Easton | B23D 45/126 83/54 |
| 6,516,694 | B1 * | 2/2003 | Easton | B23D 45/126 269/17 |
| 6,543,498 | B1 * | 4/2003 | Woodham | B23D 47/12 144/242.1 |
| 7,011,124 | B1 * | 3/2006 | Morey | A01G 23/067 144/24.12 |
| 7,077,345 | B2 * | 7/2006 | Byram | B02C 13/286 241/34 |
| 7,886,642 | B2 * | 2/2011 | Barker | B23Q 17/20 144/356 |
| 7,934,523 | B2 * | 5/2011 | Little | A01G 23/091 144/335 |
| 8,109,303 | B1 * | 2/2012 | Holmes | A01G 23/067 144/24.12 |
| 9,259,849 | B2 * | 2/2016 | Hilsgen | B23D 45/027 |
| 9,616,893 | B2 * | 4/2017 | Bejcek | B60W 30/18009 |
| 10,039,239 | B2 * | 8/2018 | Brand | A01G 23/06 |
| 10,065,337 | B1 * | 9/2018 | Steciak, Jr. | B27B 5/10 |
| 2007/0194617 | A1 * | 8/2007 | Moller | B23D 59/001 299/1.5 |
| 2008/0017182 | A1 * | 1/2008 | Hilsgen | B27B 5/10 125/13.01 |
| 2012/0298260 | A1 * | 11/2012 | Kamps | B27B 5/02 144/4.6 |
| 2013/0284317 | A1 * | 10/2013 | Cudoc | B27B 31/00 144/343 |
| 2014/0069554 | A1 * | 3/2014 | Raszga | A01G 23/083 144/336 |
| 2015/0289456 | A1 * | 10/2015 | Cudoc | A01G 23/097 144/429 |

* cited by examiner

SELF-POWERED TIMBER SLASHER

The current application is a continuation-in-part (CIP) application of a U.S. non-provisional application Ser. No. 15/679,491 filed on Aug. 17, 2017. The U.S. non-provisional application Ser. No. 15/679,491 claims a priority to a U.S. provisional application Ser. No. 62/529,576 filed on Jul. 7, 2017.

FIELD OF THE INVENTION

The present invention relates generally to logging machinery. In particular, the present invention relates to a self-powered timber slasher.

BACKGROUND OF THE INVENTION

Timber slashers are machines that are used to cut long trees into shorter length logs. In general, timber slashers are either mounted on a trailer or they sit on the ground with its own frame and no tires. Since past few decades, the swing style timber slasher has proven to be a labor-saving attachment for the forest industry. Often, they have 48"-84" carbide tipped teeth that easily saw through muddy frozen trees. Therefore, many timber producers buy and depend on them to this day.

Many timber slashers rely on hydraulic power obtained from a log loader. The log loader is a separate machine which may be placed near a timber slasher. A log loader is a machine used to load and unload timber from log transportation vehicles and storage piles. The log loaders are often custom built with an extra dedicated hydraulic pump, valves, hoses, and other equipment required to power a saw of a timber slasher. The log loaders available in the market come with three options: no saw package, chain saw package, and circular saw package. If there is no saw, the machine is capable of loading logs only. With the separate chain saw option, operators are able to power a chain saw slasher, but they are slow, and dull easily and often. The circular saw is the fastest way to cut trees into pre-chosen shorter logs or pulp length pieces. Therefore, users often purchase log loaders with a circular saw package, so that it can power a timber slasher.

However, many timber producers today are having a hard time running their businesses due to adverse weather and economic conditions. They are still using older, outdated log loaders that have been paid for, and get the job done. But most of these outdated log loaders are not equipped to run a chain saw slasher or a top of the line productive circular saw attachment. It is very costly to add a chain saw hydraulic system to a "bare" log loader. Further, it is expensive and almost impossible to add a circular saw package to a machine after it has left the manufacturing factory. The swivel center port in the heart of a bare loader may have 5 ports. But a chain saw center swivel may have 7-8 ports with regular pump pressures and gallons per minute. Further, circular saws may need 11-13 ports at 65 gallons per minute to operate.

Therefore, a circular saw package on a log loader built at the factory is also available. These machines operate at higher pressures and may reach up to 75 gallons per minute. The flow from a dedicated pump through a center swivel through valves out the hoses to a hydraulic motor that rotates the circular saw. However, when users operate these machines, they take precious power from the log loader, thereby restricting its use for other duties. Therefore, during a cut, an operator is unable to do anything with the log loader until the circular saw exits the cut and goes back into the stand-by mode. Further, considerable heat buildup is created when making high volume (such as 100 gallons) of hydraulic oil travel around in a circuit. Yet further, the saw blade never stops rotating, it keeps running, waiting for the operator to swing it into the next cut. It uses momentum to power through the timber.

However, it is expensive to add the circular saw package at a factory. A lot of extra valves, electrical circuits, pumps, hoses, coolers, and electronics is needed to be installed in an already tightly packed area on the machine. Also, when such a machine experiences a catastrophic failure (such as in a pump or valve), the contaminated oil may be routed out to and back from the separate slasher, causing that machine to be infected (such as by metal in the oil).

Therefore, a timber slasher needs to be connected to only that log loader that is properly equipped from the factory to safely and efficiently operate the circular saw unit. When the log loader is down for repairs, the slasher can't be used as it needs the power derived from the loader to get it operating. Most manufacturers today offer the circular saw package on a large truck or a trailer mounted log loader. Some manufacturers provide a saw package built into a crawler mounted log loader. These machines are very versatile in the woods as they can be moved instantaneously during any part of the day. Further, they don't need to be exited down into a truck. However, in sub-zero weather, these machines may freeze up mechanically and physically in mud and snow. Also, trailer mounted rigs have to be moved by a skidder or another tractor even if it needs to go just a small distance (such as, 10 feet). Also note, a saw package installed on an excavator is not available anywhere. Some contractors may use their machine in the summer to build roads, load gravel, or for other general excavating. In the winter, when logging is advantageous, they convert their excavator into a log loader by removing the dirt bucket and installing a log grapple. Accordingly, one machine can be used 12 months a year. This is advantageous as they need just one machine instead of having two machines, which requires less investment, maintenance and repairs. However, such excavators cannot be used for cutting timber as they do not have a built-in saw package to power a slasher.

Further, some existing log loaders do not have ball valves installed in the bottom of the tank. Therefore, if a hose is blown away, the operator will lose all their hydraulic oil on the ground. While the pump is detached and being repaired, a diesel vacuum unit needs to be hooked up to hold the oil in the tank. It is expensive to carry a diesel-powered vacuum unit to maintain oil in the tank in case of a blown hose. Typically, only dealer's service trucks have them. Moreover, in the existing machines, debris or human error may cause the hydraulic lines to get damaged or get broken, causing oil spills and down time.

Accordingly, there is a need for an apparatus for logging which may allow an operator to upgrade a bare log loader with a productive circular saw. Further, the apparatus may not rely on power from a log loader, which allows for safer and more efficient operation. Yet further, a versatile apparatus is required that may operate with any excavator or log handling device to enable safe and efficient production of logs, pulp and firewood.

It is much safer to have one loader/slasher operator cutting of trees than two or three employees on the ground with rulers and chainsaws cutting by hand.

Many injuries and deaths have occurred by a loader operator who has his vision blocked by the boom when he rotates his machine.

SUMMARY OF THE INVENTION

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

Disclosed is a self-powered timber slasher. The self-powered timber slasher includes a self-propelled carrier and a powered circular saw mounted on a first end of the self-propelled carrier, wherein the powered circular saw is configured to cut timber. Further, the self-powered timber slasher has an engine mounted on a second end of the self-propelled carrier, wherein the engine is configured to generate power for operating the powered circular saw. Yet further, the self-powered timber slasher has a wireless controller electrically coupled to the powered circular saw. The wireless controller is configured to control operation of the powered circular saw based on a command received over a wireless communication channel.

According to some aspects, the present disclosure provides an apparatus for logging (a timber slasher), which includes a separate self-powered unit which allows for safer and more efficient operation. The apparatus includes a powered circular saw, a self-powered unit, hydraulics and all electronics required to operate the circular saw. The apparatus may be used with existing bare log loaders. No expensive upgrades are required on the existing bare log loaders. Any loader or excavator (new or old), can be used to load trees and remove cut logs from its deck because the disclosed apparatus is a totally separate, self-powered unit. Further, no hoses or electronics need to be hooked up.

According to some aspects, the present disclosure allows for a cordless remote control of the disclosed timber slasher from the cab of a log loader (or an excavator). A separate small remote control may be strapped to any joystick, lever, or dashboard in the log loader (or an excavator). Therefore, no electrical or hydraulic connections are required between the log loader (or excavator), and the disclosed timber slasher.

Further, if a contractor has a major failure with a log loader (such as with a self-propelled carrier, tracks, or wheels), they may pull up to this damaged unit and carry on production with a spare bare loader (or excavator), while the damaged one is being repaired. Further, if there is a catastrophic breakdown on one machine, then it does not have an adverse effect on the other machine. The heat buildup is also low because of separate hydraulic systems.

The disclosed timber slasher includes ball valves to save the hydraulic oil if a hose fails. Further, the disclosed timber slasher includes tracks; therefore, it is very stable and it does not suffer from the problem of flat tires.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
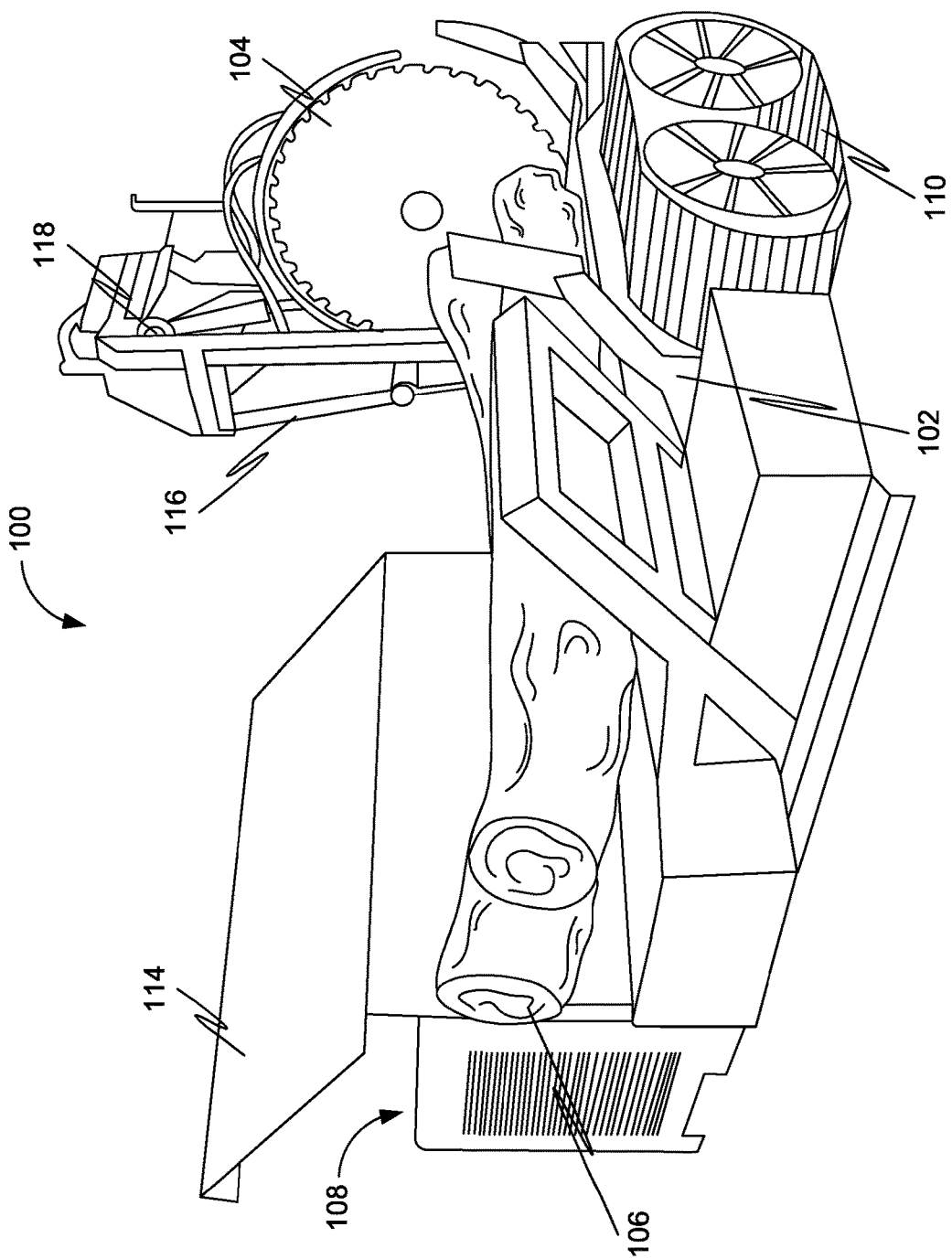
FIG. 1 illustrates a front right side perspective view of a self-powered timber slasher, in accordance with some embodiments.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of provisioning timber slashers, embodiments of the present disclosure are not limited to use only in this context.

Please refer to FIGS. 1-9, the present disclosure provides a self-powered timber slasher 100. FIG. 1 illustrates a front right side perspective view of the self-powered timber slasher 100, in accordance with some embodiments. The self-powered timber slasher 100 includes a self-propelled carrier 102. Further, the self-powered timber slasher 100 includes a powered circular saw 104 mounted on a first end (a rear end) of the self-propelled carrier 102. The powered circular saw 104 is configured to cut timber (such as logs 106). Further, the blade of the powered circular saw 104 may have any suitable size, such as any size between 24"-84" or even larger.

The self-propelled carrier 102 may include either a track assembly system or a wheel assembly system. As shown FIG. 8, the self-propelled carrier 102 comprises at least two track assemblies 110. The at least two track assemblies 110 may be made of one or both of rubber and steel and facilitates mobility of the present invention. As shown FIG. 9, the self-propelled carrier 102 comprises at least two wheel assemblies 111. The at least two wheel assemblies 111 may be made of one or both of rubber and steel and facilitates mobility of the present invention. During operation, even seasoned operators may accidentally bump the top of the self-propelled carrier 102 and roll it over on its side. During such accidents, the saw blade may hit the ground and cause severe damage to itself and the surrounding area. Therefore, the at least two track assemblies 110 or the at least two wheel assemblies 111 may be designed to be heavy and sturdy to eliminate the risk of tipping over of the self-powered timber slasher 100.

Further, the self-propelled carrier 102 may include a frame configured to station the self-powered timber slasher 100 on the ground. For example, the self-powered timber slasher 100 may be stationed on the ground when it is used to cut timber. This may provide more stability to the self-propelled carrier 102.

Figure 2:
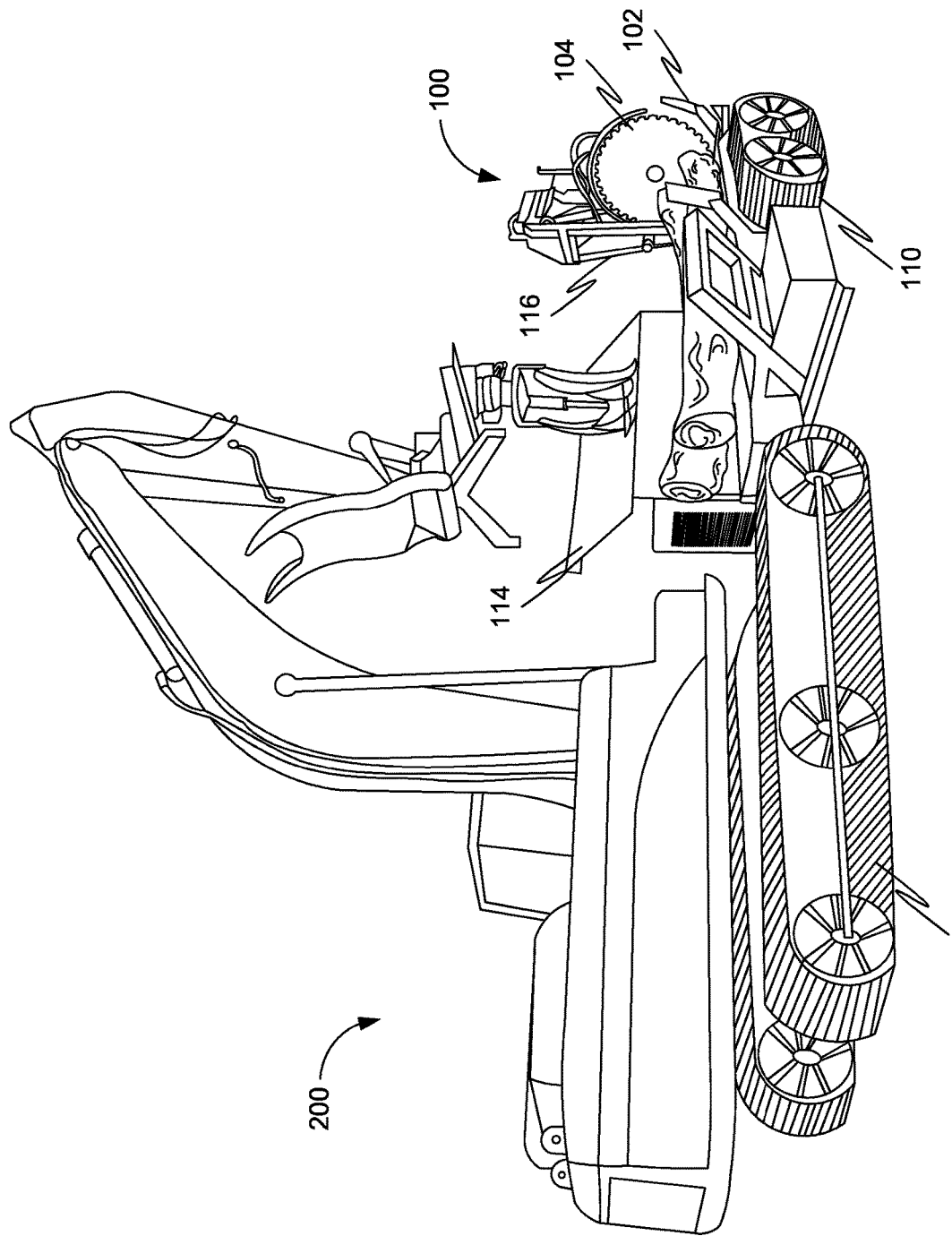
FIG. 2 illustrates a front right side perspective view of the self-powered timber slasher along with a vehicle, in accordance with some embodiments.
Figure 4:
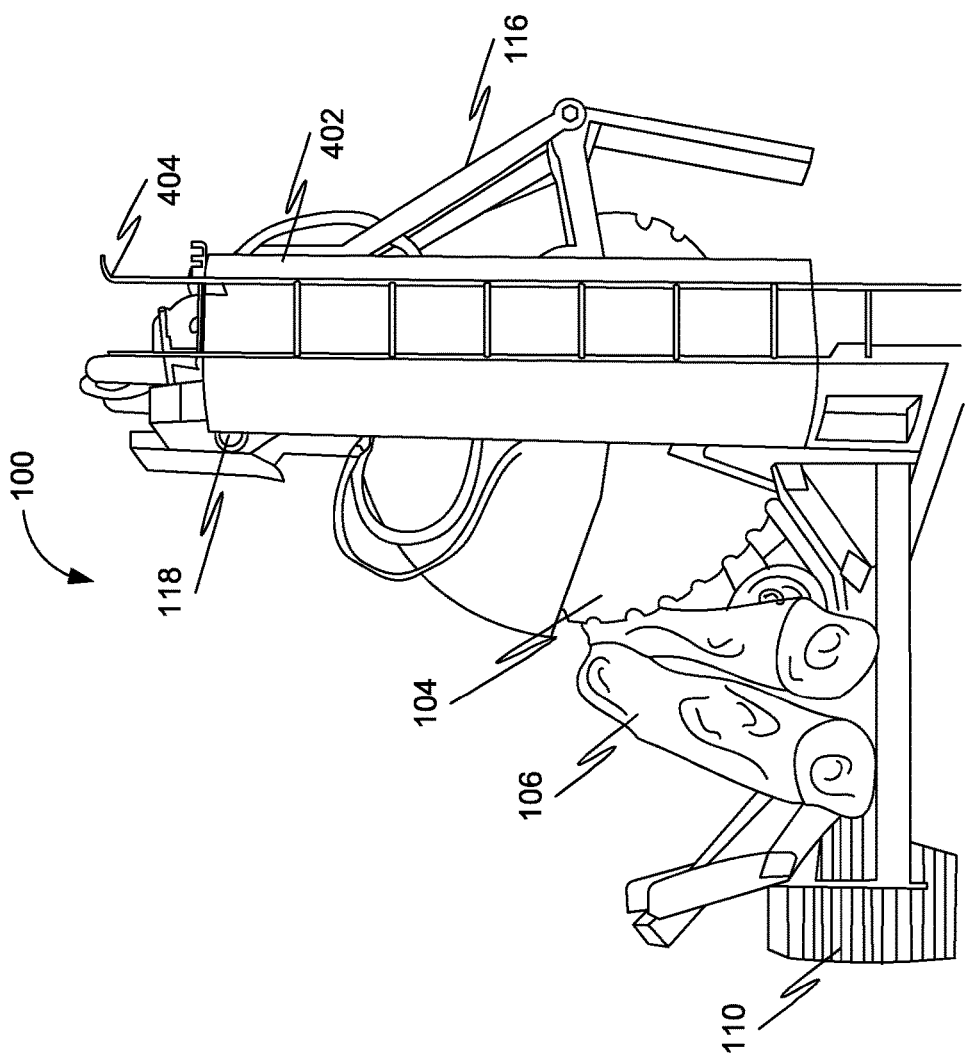
FIG. 4 illustrates a rear perspective view of the self-powered timber slasher, in accordance with some embodiments.

Further, the self-powered timber slasher 100 may include a coupling mechanism configured to attach the self-powered timber slasher 100 to a vehicle 200 as shown in FIG. 2. The coupling mechanism may include a pivotal joint configured to allow pivotal motion between the self-powered timber slasher 100 and the vehicle 200. FIG. 4 illustrates a rear perspective view of the self-powered timber slasher 100. The vehicle 200 may facilitate mobility of the self-powered timber slasher 100. The vehicle 200 may include one or both of a track and a wheel. As shown, the vehicle has tracks 202. The vehicle 200 may be a log loader, such as a crawler log loader. Alternatively, the vehicle may be an excavator comprising a log grapple configured to be removably attachable to the excavator.

Figure 3:
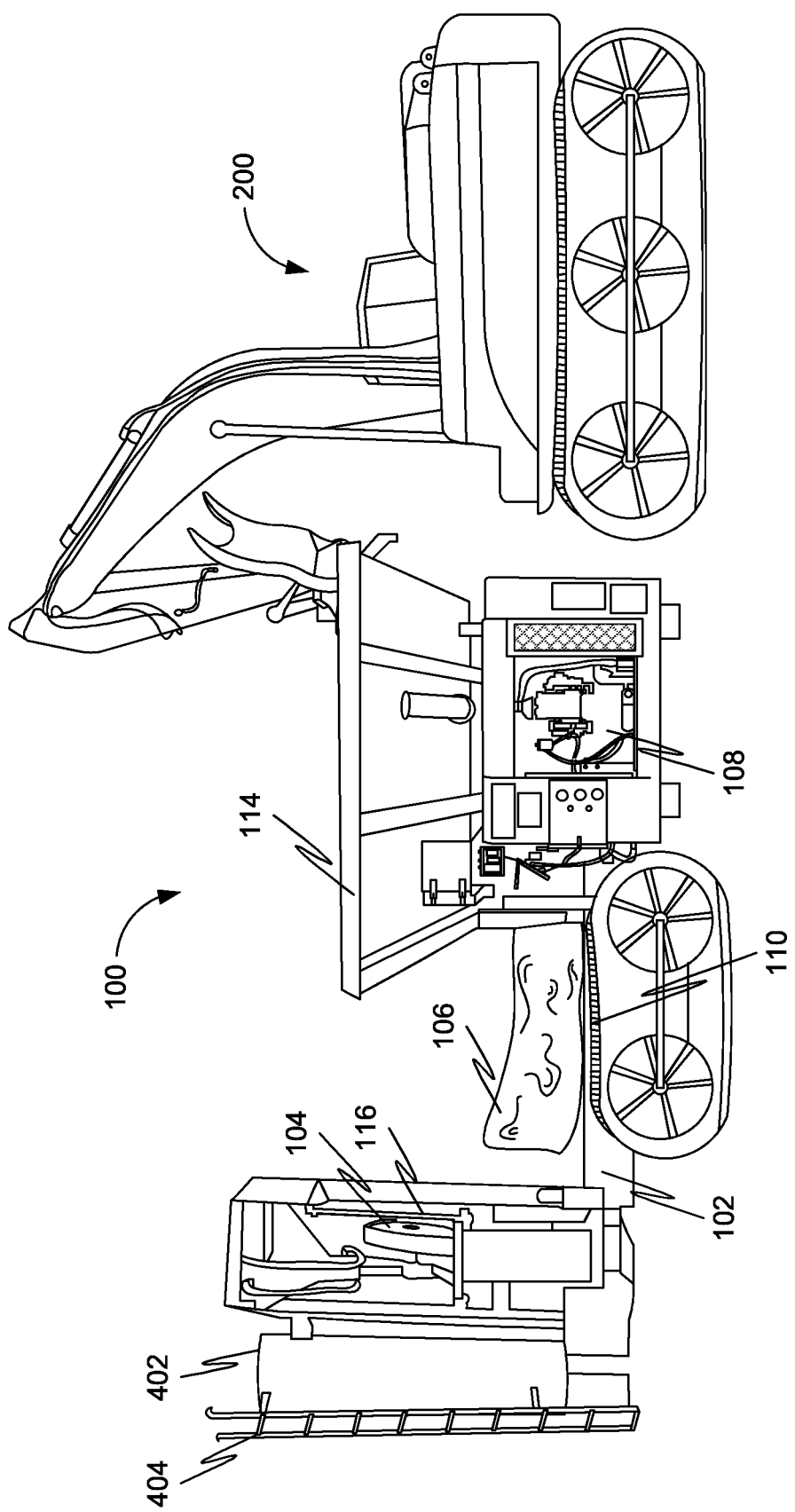
FIG. 3 illustrates a left side view of the self-powered timber slasher along with the vehicle, in accordance with some embodiments.
Figure 5:
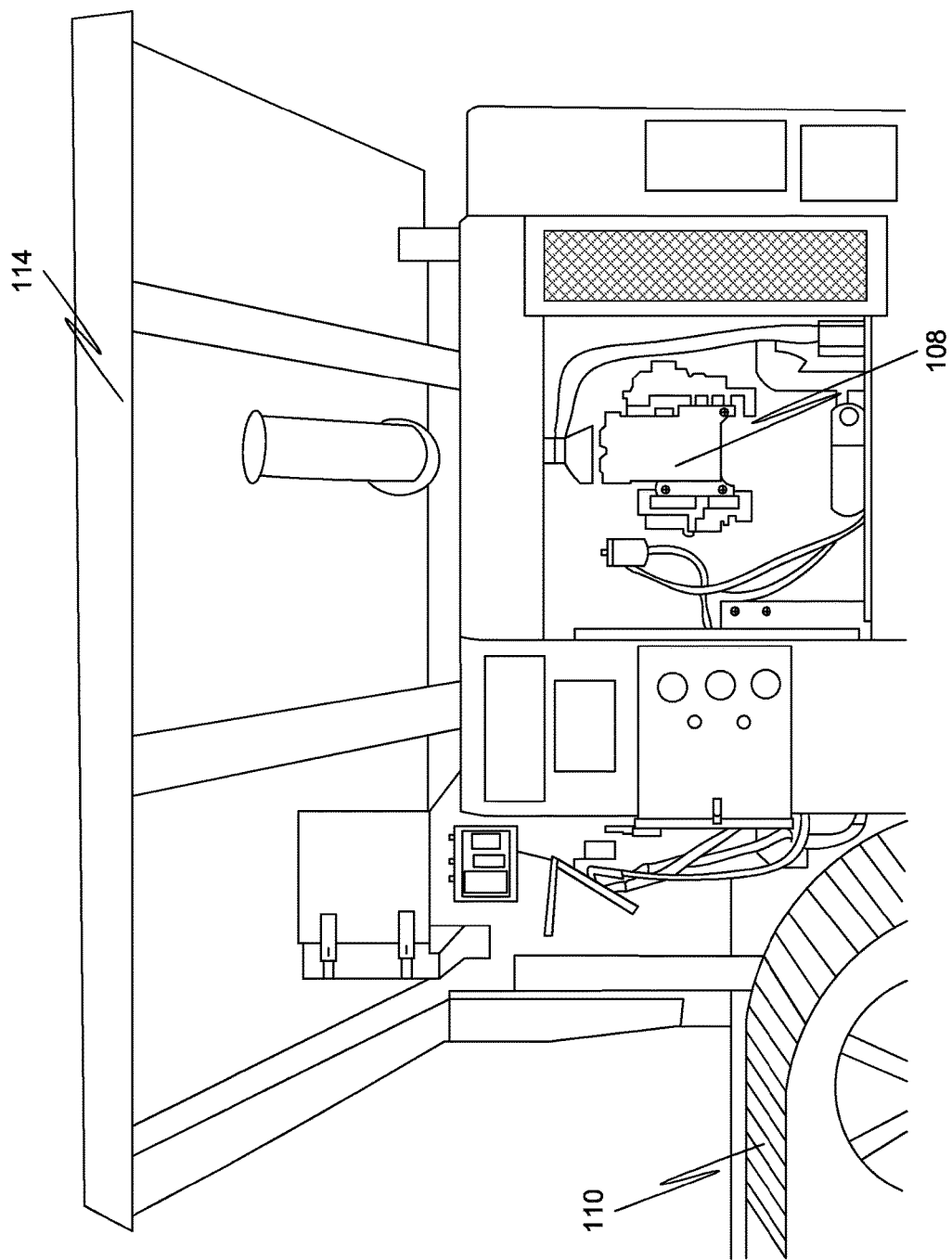
FIG. 5 illustrates a side view of an engine of the self-powered timber slasher, in accordance with some embodiments.

Yet further, the self-powered timber slasher 100 includes an engine 108 mounted near a second end (a front end) of the self-propelled carrier 102 as shown in FIG. 3. FIG. 5 illustrates a side view of the engine 108, in accordance with some embodiments. The engine 108 may be mounted low, with easy access from all sides, even the log side with a removable protective side shield 114. The engine 108 is configured to generate power for operating the powered circular saw 104. The engine 108 may be a fuel powered engine. For example, the engine 108 may be a 125-horsepower diesel engine. Further, the powered circular saw 104 may be rotationally coupled to the engine 108.

Moreover, the self-powered timber slasher 100 includes a wireless controller (not shown) electrically coupled to the powered circular saw 104. The wireless controller is configured to control operation of the powered circular saw 104 based on a command received over a wireless communication channel. The wireless controller may be further configured to receive a capacity indicator associated with the vehicle 200, wherein the wireless controller may be further configured to control operation of the powered circular saw 104 based on the capacity indicator. Further, the vehicle 200 may include a portable operator device configured to wirelessly transmit the command to the wireless controller based on an input from an operator. The portable operator device may be removably attached to a vehicle controller device configured to control operation of the vehicle 200. For example, the portable operator device may be strapped to any joystick, lever, or dashboard of the vehicle 200.

The self-powered timber slasher 100 may further include a hydraulic tank 402 configured to store a hydraulic fluid. For example, the hydraulic tank 402 may have a capacity of 125-gallon. Also, the hydraulic fluid may be a general hydraulic oil, a wear-resistant hydraulic oil and a flame retardant hydraulic oil. Further, the self-powered timber slasher 100 may include a hydraulic motor coupled to the powered circular saw 104. The hydraulic motor may be configured to impart a rotational motion to the powered circular saw 104 based on a flow of the hydraulic fluid. The hydraulic motor may be in fluid connection with the hydraulic tank 402. Yet further, the self-powered timber slasher 100 may include a hydraulic pump configured to transport the hydraulic fluid between the hydraulic tank and the hydraulic motor. The hydraulic pump may be in fluid connection with each of the hydraulic tank and the hydraulic motor. The hydraulic pump may obtain power from the engine 108. For example, a Kawasaki™ excavator style hydraulic pump may be used that allows the engine 108 to easily start in cold weather with no load on it, until a valve is actuated to operate a function after the engine warm-up. This pump is capable of pushing 65 gallons a minute from the hydraulic tank 402 through the valves and hydraulic motors and then back to hydraulic tank 402.

Further, a ladder 404 may be installed next to hydraulic tank 402, so the hydraulic tank 402 can be accessed easily by an operator. The hydraulic tank 402 may also have a built-in safety strainer. The hydraulic tank 402 may be built out of stainless steel for longevity. Various fuel lines may be routed in tubes for protection. Further, separate hydraulic suction lines and filters may be used to keep contaminants out of the hydraulic fluid. The high-pressure lines may be routed from the hydraulic pump to valves to bulk head fittings in the frame of the self-powered timber slasher 100. From there, they are routed internally to be protected from logs or anything else that may hit them. For example, the high-pressure lines may be routed internally through 8×8 tubes. Similarly, incoming low-pressure suction lines may also be routed for protection internally inside 6×6 tubes.

Yet further, the self-powered timber slasher 100 may include a swing arm 116 configured to swing about a pivot 118, wherein the powered circular saw 104 is mounted on the swing arm 116. Further, the self-powered timber slasher 100 may include a hydraulic actuator coupled to the swing arm 116. The hydraulic actuator may be configured to impart a pivotal motion to the swing arm 116 based on a flow of the hydraulic fluid, wherein the hydraulic motor is in fluid connection with the hydraulic tank 402. The self-powered timber slasher 100 may also include a gear pump configured to transport the hydraulic fluid between the hydraulic tank and the hydraulic actuator, wherein the hydraulic pump is in fluid connection with each of the hydraulic tank and the hydraulic actuator.

Figure 7:
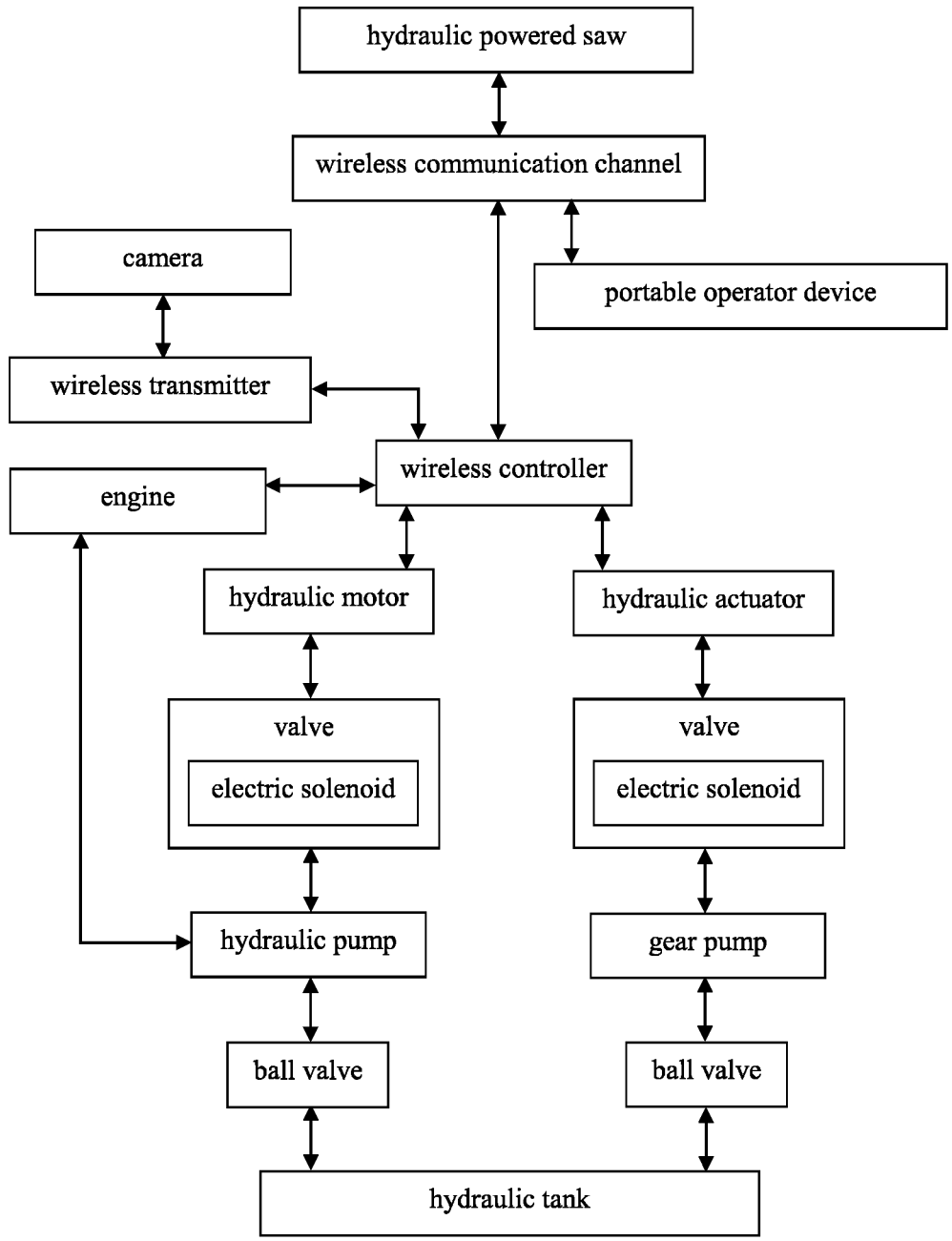
FIG. 7 illustrates a diagram of connections between some elements of the self-powered timber slasher, in accordance with some embodiments.

Moreover, as shown in FIG. 7, the self-powered timber slasher 100 may include one or more valves configured to control a flow of the hydraulic fluid to the hydraulic motor. The one or more valves may include an electric solenoid configured to control the flow of the hydraulic fluid based on an electrical signal receivable from the wireless controller. The electric solenoid may be electrically coupled to the wireless controller. Further, the self-powered timber slasher 100 may include another valve configured to control a flow of the hydraulic fluid to the hydraulic actuator, wherein the valve may include an electric solenoid configured to control the flow of the hydraulic fluid based on an electrical signal receivable from the wireless controller, wherein the electric solenoid may be electrically coupled to the wireless controller. For example, Galtech™ valves may be used as they have manual hand controls and built in electric solenoids.

Yet further, the self-powered timber slasher 100 may include one or more ball valves disposed proximate to a bottom of the hydraulic tank 402, wherein one or more ball valves may be configured to shut-off flow of the hydraulic fluid from the hydraulic tank 402. The one or more ball valves may be shut off in the event of a repair or malfunction, so that no hydraulic fluid is lost on the ground.

Figure 6:
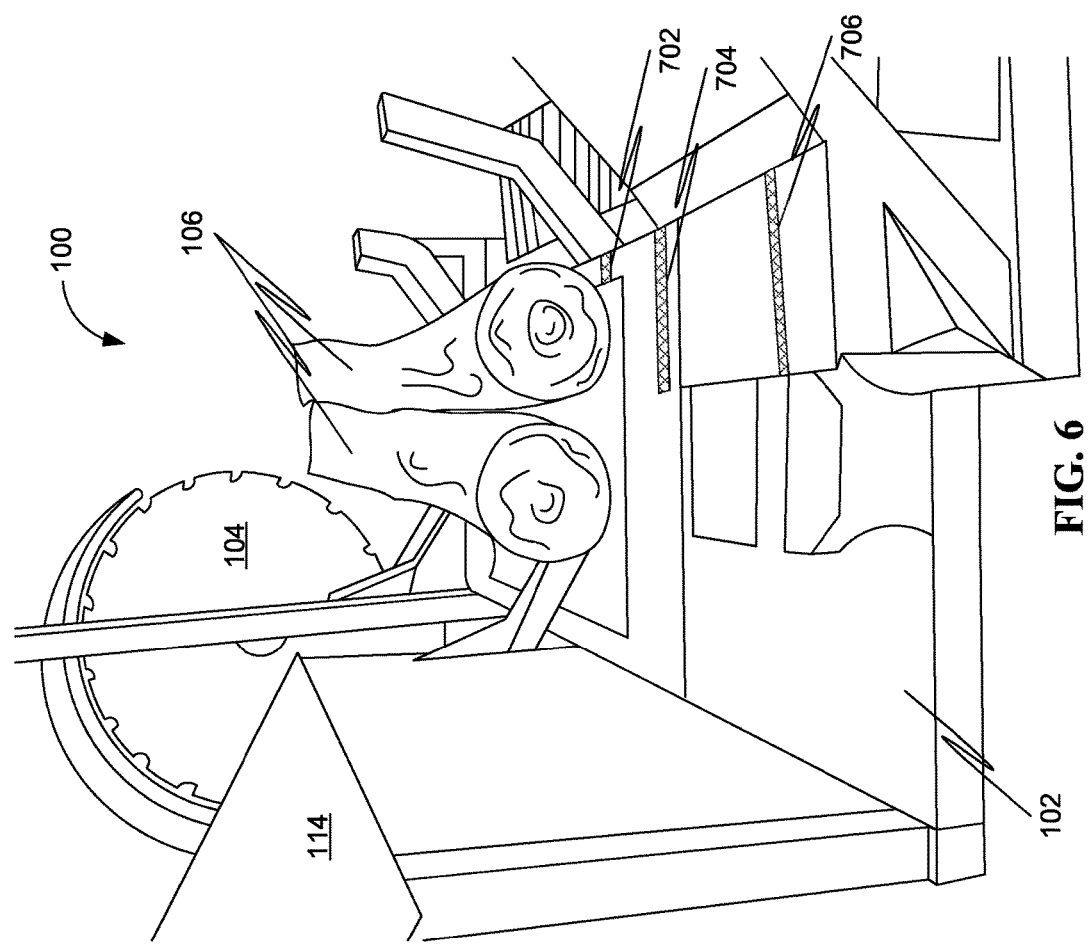
FIG. 6 illustrates a front perspective view of the self-powered timber slasher, in accordance with some embodiments.

Several guides may be marked on the self-powered timber slasher 100 to indicate the length of the log being cut. This may help the operator to accurately cut the logs. FIG. 6 shows guides 702, 704, and 706 marked on the deck of the self-powered timber slasher 100. The guides 702, 704, and 706 may correspond to for 8', 10', 12' lengths respectively.

Figure 8:
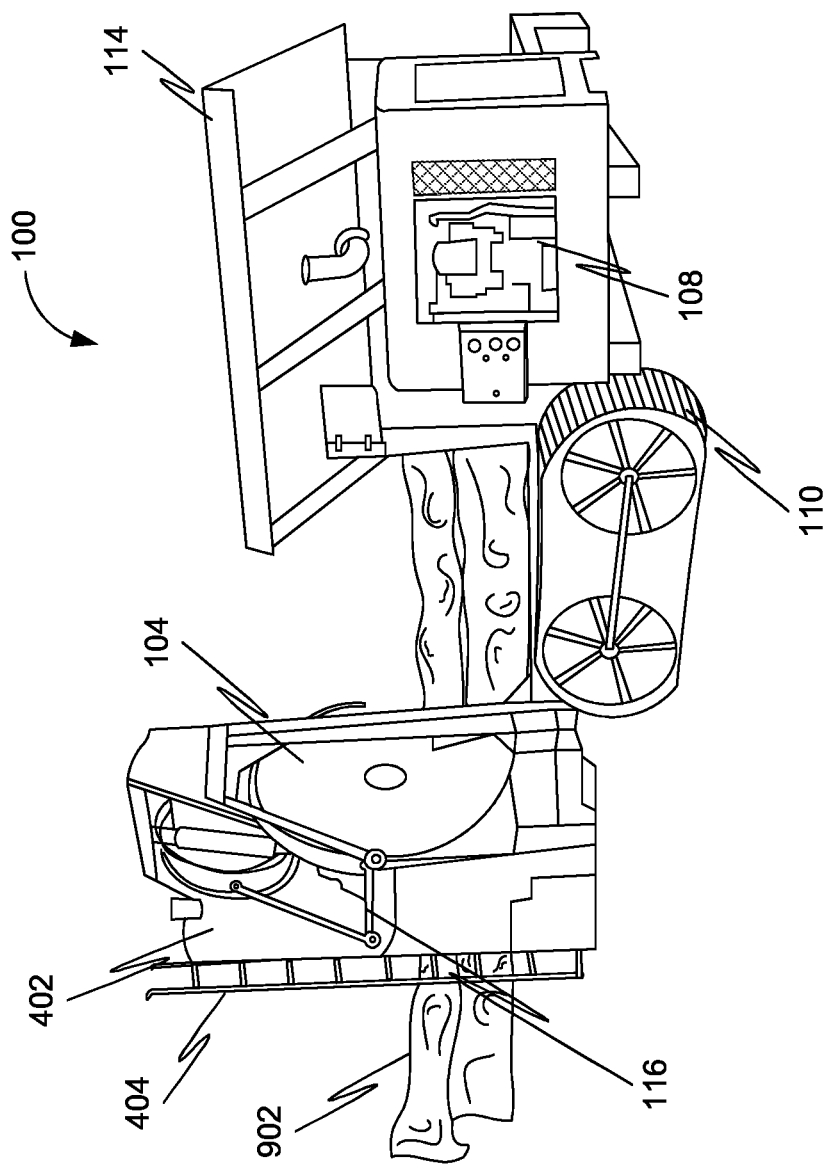
FIG. 8 illustrates the self-powered timber slasher while it is cutting long logs, in accordance with some embodiments with the at least two track assemblies.
Figure 9:
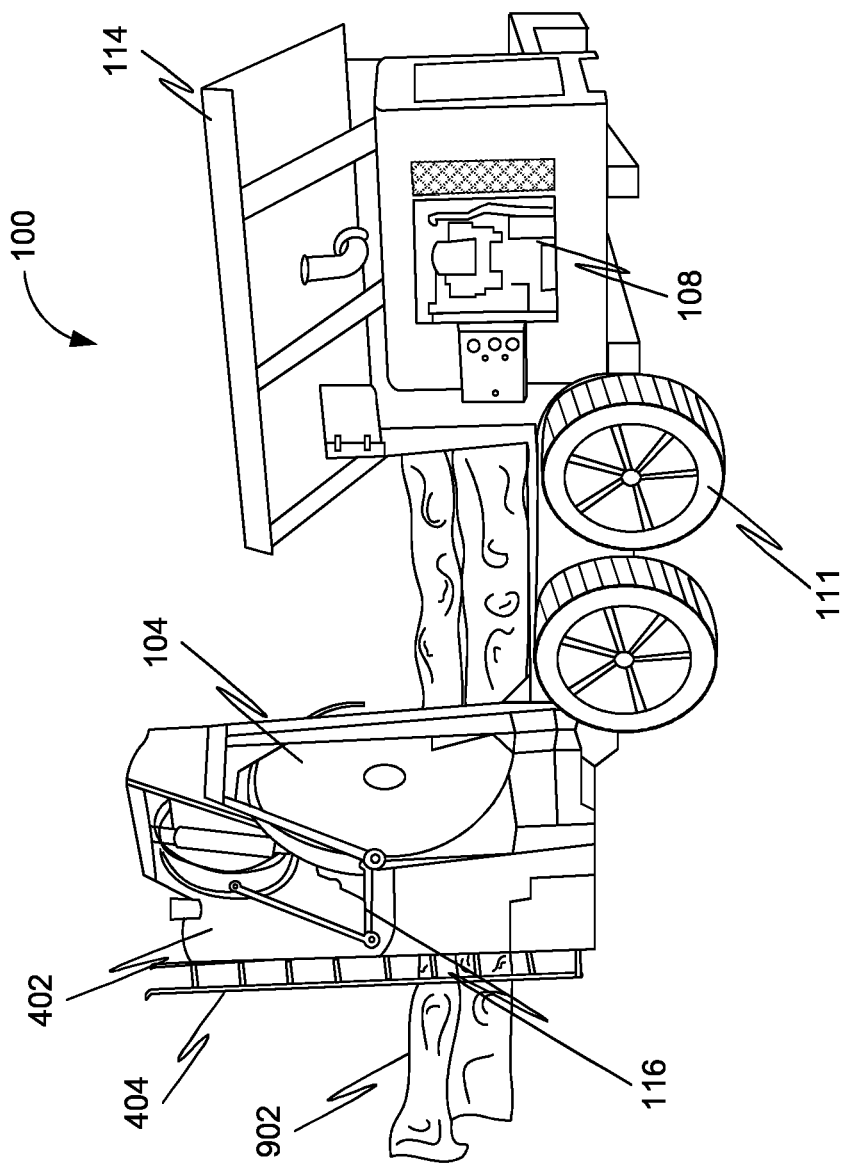
FIG. 9 illustrates the self-powered timber slasher while it is cutting long logs, in accordance with some embodiments with the at least two wheel assemblies.

However, when trees are to be cut into logs longer than 20 feet, the self-powered timber slasher 100 maybe set sideways and pinned to a concrete deadman hitch. Accordingly, the self-powered timber slasher 100 may also include a coupler configured to pin the self-powered timber slasher 100 to the concrete deadman hitch via the coupling mechanism. FIG. 8-9 shows the self-powered timber slasher 100 while it is cutting long logs 902.

According to further embodiments, the self-powered timber slasher 100 may include one or more cameras to capture at least one or more portions of a tree that needs to be cut at a desired length. When using the deadman hitch, the self-powered timber slasher 100 may be 20-30 feet away from the log handling device. The operator does not need to strain his eyes to check on the proper length of the log to be cut. He may just glance on a camera monitor in the cab for the correct length and avoid a miscut. Further, the self-powered timber slasher 100 may include a wireless transmitter coupled to the at least one camera, wherein the wireless transmitter is configured to transmit images captured by the one or more cameras.

According to further embodiments, the self-powered timber slasher 100 may include a proximity sensor configured to detect a proximity of the vehicle 200 to the self-powered timber slasher 100. The wireless controller is electrically coupled to the engine 108, wherein the wireless controller is further configured to control operation of the engine 108 based on the proximity.

Detail Descriptions of the Embodiments

A self-powered timber slasher may be provided. The self-powered timber slasher may include a self-propelled carrier. Further, the self-powered timber slasher may include a powered circular saw mounted on a first end of the self-propelled carrier. Further, the powered circular saw may be configured to cut timber. Further, the self-powered timber slasher may include an engine mounted on a second end of the self-propelled carrier. Further, the engine may be configured to generate power for operating the powered circular saw. Further, the self-powered timber slasher may include a wireless controller electrically coupled to the powered circular saw. Further, the wireless controller may be configured to control operation of the powered circular saw based on a command received over a wireless communication channel.

In some embodiments, the self-powered timber slasher may further include at least one mobility device attached to the self-propelled carrier. Further, the at least one mobility device facilitates mobility of the self-powered timber slasher.

In some embodiments, the at least one mobility device may comprise at least two track assemblies so that the self-propelled carrier can move from one location to another.

In some embodiments, the at least one mobility device may comprise at least two wheel assemblies so that the self-propelled carrier can move from one location to another.

In some embodiments, the self-powered timber slasher may further include a frame configured to station the self-powered timber slasher on the ground.

In some embodiments, the self-powered timber slasher may be mounted on a self-propelled carrier with rubber tires or even steel wheels.

In some embodiments, the engine may include a fuel powered engine.

In some embodiments, the powered circular saw may be rotationally coupled to the engine.

In some embodiments, the self-powered timber slasher may further include a hydraulic tank configured to store a hydraulic fluid and a hydraulic motor coupled to the powered circular saw. Further, the hydraulic motor may be configured to impart a rotational motion to the powered circular saw based on a flow of the hydraulic fluid. Further, the hydraulic motor may be in fluid connection with the hydraulic tank. Further, a hydraulic pump may be configured to transport the hydraulic fluid between the hydraulic tank and the hydraulic motor. Further, the hydraulic pump may be in fluid connection with each of the hydraulic tank and the hydraulic motor.

In some embodiments, the self-powered timber slasher may further include a swing arm configured to swing about a pivot. Further, the powered circular saw may be mounted on the swing arm and a hydraulic actuator may be coupled to the swing arm. Further, the hydraulic actuator may be configured to impart a pivotal motion to the swing arm based on a flow of the hydraulic fluid. Further, the hydraulic motor may be in fluid connection with the hydraulic tank. Further, a gear pump may be configured to transport the hydraulic fluid between the hydraulic tank and the hydraulic actuator. Further, the hydraulic pump may be in fluid connection with each of the hydraulic tank and the hydraulic actuator.

In some embodiments, the self-powered timber slasher may further include at least one valve configured to control a flow of the hydraulic fluid to the hydraulic motor. Further, the at least one valve may include an electric solenoid configured to control the flow of the hydraulic fluid based on an electrical signal receivable from the wireless controller. Further, the electric solenoid may be electrically coupled to the wireless controller.

In some embodiments, the self-powered timber slasher may further include a valve configured to control a flow of the hydraulic fluid to the hydraulic actuator. Further, the valve may include an electric solenoid configured to control the flow of the hydraulic fluid based on an electrical signal receivable from the wireless controller. Further, the electric solenoid may be electrically coupled to the wireless controller.

In some embodiments, the self-powered timber slasher may further include at least one ball valve disposed proximate to a bottom of the hydraulic tank. Further, the at least one ball valve may be configured to shut-off flow of the hydraulic fluid from the hydraulic tank.

In some embodiments, the self-powered timber slasher may further include a coupling mechanism configured to attach the self-powered timber slasher to a vehicle.

In some embodiments, the coupling mechanism may include a pivotal joint configured to allow pivotal motion between the self-powered timber slasher and the vehicle.

In some embodiments, the self-powered timber slasher may further include a coupler configured to pin the self-powered timber slasher to a concrete deadman hitch.

In some embodiments, the vehicle may be a log loader. In some embodiments, the log loader may be a crawler log loader. In some embodiments, the vehicle may be an excavator including a log grapple configured to be removably attachable to the excavator.

In some embodiments, the vehicle may include a portable operator device configured to wirelessly transmit the command to the wireless controller based on an input from an operator.

In some embodiments, the portable operator device may be removably attached to a vehicle controller device configured to control operation of the vehicle.

In some embodiments, the self-powered timber slasher may further include at least one camera to capture at least one portion of the self-powered timber slasher. Further, a wireless transmitter may be coupled to the at least one camera. Further, the wireless transmitter may be configured to transmit images captured by the at least one camera.

In some embodiments, the self-powered timber slasher may further include a proximity sensor configured to detect a proximity of the vehicle to the self-powered timber slasher. Further, the wireless controller may be electrically coupled to the engine. Further, the wireless controller may be further configured to control operation of the engine based on the proximity.

In some embodiments, the wireless controller may be further configured to receive a capacity indicator associated with the vehicle. Further, the wireless controller may be further configured to control operation of the powered circular saw based on the capacity indicator.

Although the invention has been explained in relation to its preferred embodiment, it is to be understood that many other possible modifications and variations can be made without departing from the spirit and scope of the invention as hereinafter claimed.

What is claimed is:

1. A self-powered timber slasher comprising:
   a self-propelled carrier;
   the self-propelled carrier comprising a frame and an engine for generating power to the self-propelled carrier;
   the frame comprising a first end and a second end;
   a hydraulic powered saw;
   the hydraulic powered saw being mounted on the first end of the frame;
   the hydraulic powered saw being configured to cut timber;
   a wireless controller;
   the wireless controller being electrically coupled to the hydraulic powered saw;
   a hydraulic tank;
   the hydraulic tank being configured to store a hydraulic fluid;
   a hydraulic motor;
   the hydraulic motor being coupled to the hydraulic powered saw;

the hydraulic motor being configured to impart a rotational motion to the hydraulic powered saw based on a flow of the hydraulic fluid;

the hydraulic motor being in fluid connection with the hydraulic tank;

a hydraulic pump;

the hydraulic pump being configured to transport the hydraulic fluid between the hydraulic tank and the hydraulic motor;

the hydraulic pump being in fluid connection with each of the hydraulic tank and the hydraulic motor;

the engine being mounted on the second end of the frame;

the engine being configured to generate power for the hydraulic pump and the hydraulic powered saw;

the hydraulic pump being coupled to the engine;

the hydraulic powered saw being rotationally coupled to the engine;

the wireless controller being electrically coupled to the engine of the self-propelled carrier; and the wireless controller being configured to control operation of the engine of the self-propelled carrier and the hydraulic powered saw based on a command received over a wireless communication channel.

2. The self-powered timber slasher of claim 1 comprising a track assembly system and a wheel assembly system, the self-propelled carrier being selectively attached to the track assembly system or the wheel assembly system so as to facilitate mobility of the self-powered timber slasher.

3. The self-powered timber slasher of claim 1 comprising at least two crawler track assemblies, the at least two crawler track assemblies being attached to the self-propelled carrier, the at least two crawler track assemblies facilitating mobility of the self-powered timber slasher.

4. The self-powered timber slasher of claim 3 comprising:
each of the at least two crawler track assemblies being made of a material selected from the group consisting of steel or rubber.

5. The self-powered timber slasher of claim 1 comprising at least two wheel assemblies, the at least two wheel assemblies being attached to the self-propelled carrier, the at least two wheel assemblies facilitating mobility of the self-powered timber slasher.

6. The self-powered timber slasher of claim 5 comprising:
each of the at least two wheel assemblies being made of a material selected from the group consisting of steel or rubber.

7. The self-powered timber slasher of claim 1 comprising:
a swing arm;
the swing arm being configured to swing about a pivot;
the hydraulic powered saw being mounted on the swing arm;
a hydraulic actuator;
the hydraulic actuator being coupled to the swing arm;
the hydraulic actuator being configured to impart a pivotal motion to the swing arm based on the flow of the hydraulic fluid;
the hydraulic actuator being in fluid connection with the hydraulic tank;
a gear pump;
the gear pump being configured to transport the hydraulic fluid between the hydraulic tank and the hydraulic actuator; and
the hydraulic pump being in fluid connection with each of the hydraulic tank and the hydraulic actuator.

8. The self-powered timber slasher of claim 7 comprising a valve, the valve being configured to control the flow of the hydraulic fluid to the hydraulic actuator, the valve comprising an electric solenoid, the electric solenoid being configured to control the flow of the hydraulic fluid based on an electrical signal receivable from the wireless controller, the electric solenoid being electrically coupled to the wireless controller.

9. The self-powered timber slasher of claim 1 comprising a valve, the valve being configured to control the flow of the hydraulic fluid to the hydraulic motor, the valve comprising an electric solenoid, the electric solenoid being configured to control the flow of the hydraulic fluid based on an electrical signal receivable from the wireless controller, the electric solenoid being electrically coupled to the wireless controller.

10. The self-powered timber slasher of claim 1 comprising a ball valve, the ball valve being connected to the hydraulic tank, the ball valve being configured to shut-off the flow of the hydraulic fluid from the hydraulic tank.

11. The self-powered timber slasher of claim 1 comprising a portable operator device, the portable operator device being configured to wirelessly transmit the command to the wireless controller based on an input from an operator.

12. The self-powered timber slasher of claim 11, wherein the portable operator device is configured to be removably attached to a vehicle.

13. The self-powered timber slasher of claim 1 comprising:
a camera;
the camera being configured to capture at least one portion of the timber slasher; and
a wireless transmitter;
the wireless transmitter being coupled to the camera; and
the wireless transmitter being configured to transmit images captured by the camera.

* * * * *